United States Patent [19]

Sprunk

[11] Patent Number: 5,822,431
[45] Date of Patent: Oct. 13, 1998

[54] VIRTUAL AUTHENTICATION NETWORK FOR SECURE PROCESSORS

[75] Inventor: Eric Sprunk, Carlsbad, Calif.

[73] Assignee: General Instrument Corporation of Delaware, Horsham, Pa.

[21] Appl. No.: 661,968

[22] Filed: Jun. 12, 1996

Related U.S. Application Data

[60] Provisional application No. 60/010,228 Jan. 19, 1996.

[51] Int. Cl.[6] .............................. H04K 1/00; H04L 9/00
[52] U.S. Cl. ................................... 380/25; 380/23
[58] Field of Search ........................... 380/23, 25

[56] References Cited

U.S. PATENT DOCUMENTS

| | | | |
|---|---|---|---|
| 5,148,479 | 9/1992 | Bird et al. | 380/23 |
| 5,533,127 | 7/1996 | Luther | 380/28 |
| 5,535,276 | 7/1996 | Ganesan | 380/25 |
| 5,548,721 | 8/1996 | Denslow | 380/23 |

OTHER PUBLICATIONS

R. Dorf, ed., *The Electrical Engineering Handbook*, CRC Press, Boca Raton, Florida, 1993, pp. 2081–2084.

*Primary Examiner*—Thomas H. Tarcza
*Assistant Examiner*—Carmen D. White
*Attorney, Agent, or Firm*—Barry R. Lipsitz; Ralph F. Hoppin

[57] ABSTRACT

The integrity of a group of secure processing elements in a communication system is ensured with a validation scheme. Member elements are checked by adjacent members to determine whether a member has been tampered with or operatively removed from a group. If a member is found to be untrustworthy, propagation of group characteristic information to that member will be halted. The group characteristic information defines the group, and is required by each group member in order to function. The untrustworthy member is therefore effectively exiled from the group. An efficient network topology minimizes inter-member message traffic while maintaining group robustness.

20 Claims, 5 Drawing Sheets

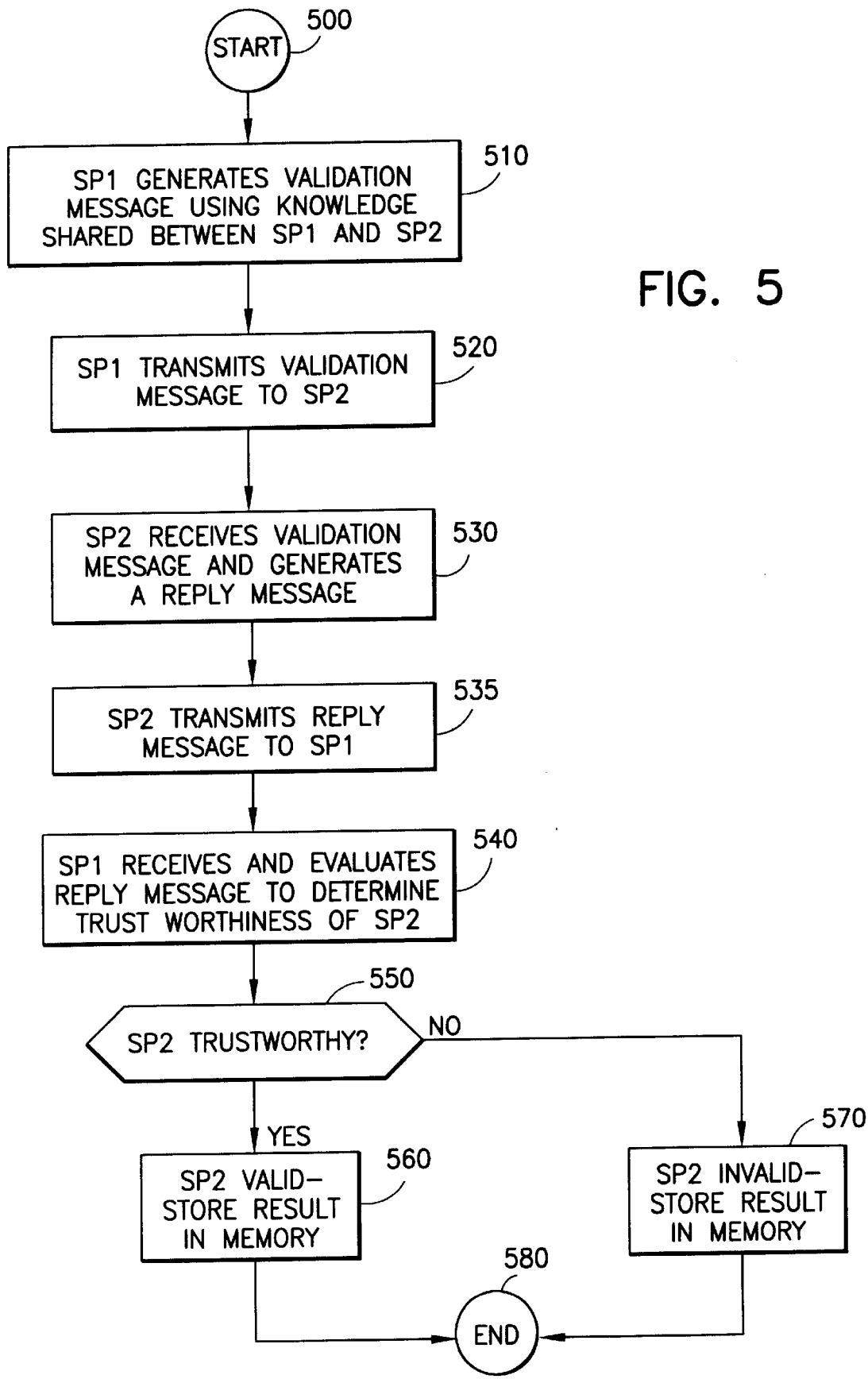

VIRTUAL AUTHENTICATION NETWORK FOR SECURE PROCESSORS

This application claims the benefit of U.S. Provisional Application No. 60/010,228, filed Jan. 19, 1996.

BACKGROUND OF THE INVENTION

The present invention relates to the secure processing of data, and more particularly to a method and apparatus for improving data security in systems using multiple secure processors.

It is standard practice to separate or partition secure processing functions from non-secure processing functions in a system. Since secure functions are often only a part of a system, it is very inefficient to protect an entire system when only a portion actually requires special levels of protection. Secure areas of the system are traditionally referred to as RED, and non-secure areas as BLACK.

It is also standard practice to employ parallelism to meet system performance and reliability requirements. In a parallel system, redundant processing elements are provided so that if one processing element fails, a backup element will be available. Moreover, when secure processing occurs in a parallel structure, multiple Secure Processors (SECPROCs) are required. However, the presence of multiple SECPROCs in different RED secure regions can create a data sharing problem between SECPROCs. Specifically, the integrity of any communication between SECPROCs in separate secure regions that passes through a BLACK, or non-secure, region is considered suspect since the message may have been altered en route.

To insure the integrity of a communication network, the network must have the capability to check the validity of its member processing elements. This can be accomplished by having each processor check all other processors. For instance, processing functions may be performed by circuit boards which are housed in a rack. In order for a given board to know that all other boards are valid and have not been tampered with or removed, the board would have to send a polling signal to each of the other boards, wait for a reply, and evaluate the reply. However, this would result in an undesirably large amount of message traffic between boards.

Accordingly, it would be desirable to provide a method and apparatus for determining if a SECPROC has been removed from its intended environment and used for illicit purposes, such as to breach, or attempt to breach, the security of the system. In particular, while the removal of all SECPROCs is easily detected due to the absence of the functions that are normally performed by the SECPROCs, the detection of the removal of less than all SECPROCs in a secure group of parallel SECPROCs for any length of time is more difficult. This is true since the removal of a small number of SECPROCs from a network employing several SECPROCs results in only a slight reduction in the output of the entire paralleled group. Accordingly, the removal may go unnoticed and result in a breach of system security.

Furthermore, it would be desirable to provide an efficient scheme which allows group members of a network to check the presence and integrity (e.g., trustworthiness) of the other group members while minimizing time-consuming inter-element message traffic.

Given a validation scheme, a set of processors which are members of a network group, and a defining characteristic by which membership in the group is controlled, it would be advantageous to provide a method for allowing the members of the group to perform intra-group validation and/or control propagation of the characteristic. Such a method should allow multiple SECPROCs which are located in different secure regions to operate securely and efficiently while also providing the capability to detect when one or more SECPROCs have been illicitly removed or tampered with. It would be further advantageous to enable a group of processors to survive the failure of some small number of member elements without undue loss of function while preserving the security of the group as a whole. It would be still further advantageous to provide a security scheme in which the group could compensate for the failure of a single SECPROC without diminishing overall group functionality, and while detecting the unauthorized removal of any SECPROC.

The present invention provides a security method and apparatus having the aforementioned and other advantages.

SUMMARY OF THE INVENTION

In accordance with the present invention, a virtual authentication network for secure processors is presented. In one embodiment, the network comprises a cryptographic ring, which is a topological network structure that defines the interrelationship between members of the group. The interrelationship is the mechanism by which validation and propagation of a group characteristic is performed. While the ring topology is used to explain the simplest use of the present invention, the invention is also applicable to more complex implementations and their topologies.

In particular, with the ring structure, each group element can communicate directly with two other group elements via respective virtual and/or physical communication channels or paths. Such channels can include, for instance, both wire and wireless paths which carry electromagnetic and/or optical signals, such as coaxial cable, optical fiber, twisted copper pairs, satellite links, and digital microwave radio. Moreover, the paths can be provided as a number of virtual paths over one or more physical channels.

The group elements may comprise application-specific integrated chips (ASICs), for instance, which are physically located within the same device. The members may perform different functions or may provide a backup or redundancy capability that is called upon only when needed. Alternatively, the members may be central processing units (CPUs) such as those found in computers that are physically located in different rooms of a building or at different locations around the world. Moreover, the invention is applicable to a wide range of networks. The invention is applicable to public, private and cooperative networks, including local area networks (LANs) and wide area networks (WANs), and to internets of different networks such as those which rely on routers. The invention provides a security scheme that is applicable to virtually any network of secure elements that work together, validate each other's trustworthiness, and react to a failed validation.

The invention is also applicable to networks which isolate, exile, disable, diminish, or otherwise control group members using the propagation of a unifying characteristic or characteristics C, or alternatively, propagation of information necessary for each member to obtain or use C.

The invention secures networks that propagate confidential information amongst group members or a subset thereof, where the propagation occurs, for example, in a broadcast (e.g., in parallel), or where the information is passed serially from one member to another until the entire group possesses the information.

Note that communication between group members can occur over physical and/or virtual communication paths. In a virtual network, there is no requirement for separate direct physical connections such as wires between each member. Instead, members can communicate with each other via a shared host or clearinghouse computer. By appropriate routing or syntax usage in a communication protocol, the flow of messages in a network can be targeted to specific members, or to all processors at the same time. For example, a local area network (LAN) is a virtual network. A LAN may physically comprise a single wire which is shared by several processors, such as personal computers, in a configuration known as an ethernet. Moreover, different physical networks can be configured to provide the same virtual network, and, conversely, a single physical network can be configured to provide different virtual networks.

Further, means are provided for maintaining the security of a network that distributes information by ensuring that the information distribution connections or interfaces between network members will resist the failure of some specified number R of members.

Furthermore, members validate each other's trustworthiness to confirm the network's topology, where validation occurs at specific connections between network members. Validation results can be used by a member as a criteria for deciding whether to propagate the characteristic C to another member.

Validation can occur after a specific number of repetitions of some processing step or action, F, has been completed. Validation can be mandated no less often than some number of occurrences of F, which could be a constant or variable determined by the network, or a value which is set by a mechanism which is external to the network.

BRIEF DESCRIPTION OF THE DRAWINGS

FIG. 5 is a flow chart of an inter-element validation procedure in accordance with the present invention.

DETAILED DESCRIPTION OF THE INVENTION

Figure 1:
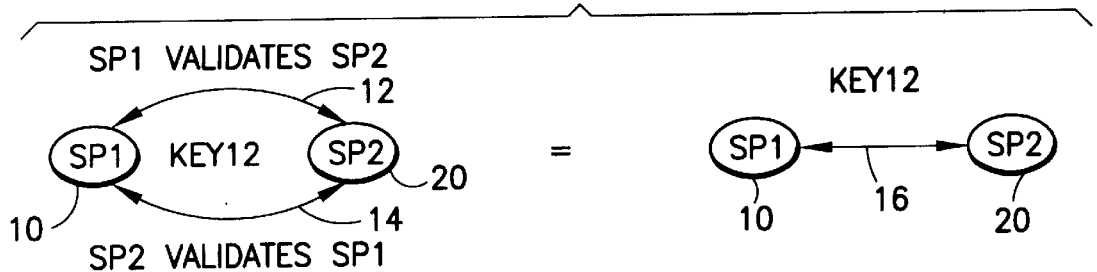
FIG. 1 is a diagrammatic illustration of a group of two secure processors in accordance with the present invention.

A secure data processing system can be more easily analyzed by using various concepts, including "integrity group," "group characteristic," and "intra-group validation."

An "integrity group" is a group of two or more SECPROCs that has a self-checking (i.e., self-validation) capability which allows the group to detect the removal or compromise of any single group member. A first member can check the validity of a second member, for instance, by sending a message that is encrypted using a key that both members share. The second member sends a reply message that the first member decodes to obtain a result that can be compared to the original message. If there is a match, then the validity of the second member has been confirmed by the first member. Alternatively, if there is no reply at all, then the first member will know that the second member has failed or has been removed from the group. A straightforward way to accomplish self-checking is to have each of the N members of a group check all other members. This procedure is effective because it allows any member to detect the absence of any other member relatively quickly if the checks are made frequently.

Implementation of this approach, unfortunately, requires a relatively large amount of traffic between SECPROCs. In particular, at least four messages must travel between each pair of group members for self-checking between the two members. For each of the N SECPROCs to send a validating message to the other (N−1) SECPROCs, there will be N(N−1) messages. Similarly, there will be N(N−1) reply messages, for a total of 2N(N−1) messages. The total number of messages that must travel between SECPROCs to confirm the presence of all N SECPROCs is given by:

TotalMessagesSent =

$$\frac{N(N-1)}{2} * 4\text{MessagesPerSECPROC} = 2N(N-1)\text{Messages}$$

The total number of required messages with this validation procedure is therefore proportional to $N^2$. For large N, the number of messages can grow prohibitively large for any nontrivial amount of parallelism. At N=10, for example, 2×10(10−1)=180 messages are required. For N=100, 19,800 messages are required. Since self-checking between SECPROCs should occur frequently to maintain system security, this validation procedure would potentially result in large amounts of message traffic. This may be undesirable if the amount of data transmitted in a message is large. The frequency of message traffic may also need to be limited, thereby reducing the benefits of the self-checking scheme.

The "group characteristic," or "integrity group defining characteristic," is the shared information that defines a group of member elements, such as secure processors. This can be understood by noting that a given SECPROC uses certain secure information to perform its function. To maintain the security of the SECPROC, the secure information should be retained wholly within a secure RED boundary, and should never exist in a form that is intelligible or visible to any observer in the BLACK region. However, other SECPROCs in other secure regions may need to share the secure information, for instance, if a SECPROC fails and another SECPROC takes over the failed SECPROCs function. Alternatively, sharing of the secure information among different SECPROCs may be required to perform specific group functions. Thus, for a set of member elements to be meaningfully grouped together, they must share some form of information such as a common functional algorithm, cryptographic key, or other data.

For example, a characteristic such as a common cryptographic key is shared automatically among group members in a system if the cryptographic key is used by all group members to perform individual or group functions. The cryptographic key should be generated randomly to effectively preclude other elements in the system from generating the same key. Moreover, when a key is a group characteristic, it is shared with members of the group other than the member that created the key. Each group member must possess the characteristic to function properly.

A secure means to propagate, or communicate, the group characteristic among the group members is required. This is particularly true when the group members are in separate secure regions and are interconnected by communication paths or channels that pass through non-secure regions. Moreover, propagation of the characteristic among group members provides an opportunity to assess the integrity or trustworthiness of each member. That is, the existence of a group characteristic automatically creates an enforcement mechanism for each member of the group to assess the integrity of the other group members and remove a member, if required. The enforcement mechanism thus allows the group members to control the functional membership of the group.

Specifically, enforcement can be carried out by controlling the propagation of the group characteristic. By definition, an element that does not possess the group characteristic information is no longer a member of the group and cannot function cohesively with the group. A member can be exiled from the group by terminating the propagation of the group characteristic to the member.

Furthermore, propagation of the group characteristic among group members can be direct or indirect. With direct propagation, the characteristic information that is propagated from group member to group member is the same information that is necessary for the group to perform its function. For example, the characteristic information may be a cryptographic key that each member needs to decode data. Direct propagation is efficient when the group defining characteristic is a small amount of information that is easy to distribute.

With indirect propagation, the actual group characteristic is not propagated because it may result in unacceptably large amounts of inter-element message traffic. Instead, data which is indicative of the group characteristic (i.e., indirect information) is communicated. The indirect information is used by group members to derive the group characteristic itself. For example, a group characteristic may comprise a large database or list of cryptographic keys which is encrypted under a cryptographic key known as "group key." The group key can be the indirect information that is propagated between the group members to allow the members to derive the group characteristic. The group characteristic can be derived using the group key and a predetermined algorithm known to the members. Furthermore, the group characteristic can be stored locally by the member for subsequent use. Thus, for a member to derive the group characteristic, the group key must be successfully propagated. If the group key is not available to a member, the group characteristic will not be available to the member, and the member is effectively exiled from the group.

Various network configurations may be employed to directly propagate a group characteristic among group members. For example, the information can be propagated from group member to group member in a ring configuration, where each member is joined to two neighboring members. With this configuration, if propagation is halted due to an error or the exile of a group member, then some group members may not have access to the information, and may consequently not be able to perform any function using that data.

The ability to control the propagation of a group characteristic, or information needed to derive the group characteristic, provides an enforcement mechanism for maintaining group security. Accordingly, a decision protocol is required to determine when to exercise such control over a given group member. The criteria for this decision should reflect the degree of trust that the group has in a given member. If the level of trust exceeds a specific threshold, the member element will be allowed to remain in the group and continue to receive the propagated group characteristic. If a member is deemed untrustworthy, however, propagation of the characteristic to the member should be terminated.

For example, one way to determine the trustworthiness to a member is to determine if the member can successfully complete a secure test operation. If the member fails the test, the member will be deemed untrustworthy. Moreover, the test can also verify the mere presence of the member to determine that the member has not been removed from the system. If the test is performed often enough, the physical presence of a member can be verified with an acceptable amount of accuracy. This is also an important factor in determining trustworthiness of a member.

"Intra-group validation," or "inter-element validation," is the process used by a group of SECPROCs to confirm the existence and trust level of all group members. Intra-group validation can be viewed as the group taking secure attendance of its SECPROCs. For example, each member may be expected to transmit a specific reply when polled with a predetermined message by other group members or by a host computer. Alternatively, a member may periodically announce its presence by transmitting a message to one or more other members.

Moreover, it is possible for an element to belong to more than one group in an overlapping, or shared, configuration. Furthermore, intra-group validation may occur among all members of a group or among a specific subset of group members. An integrity group is the set or subset of group members that are validated in an intra-validation procedure.

Furthermore, intra-group validation should validate the existence of group members at a rate which is minimally acceptable, but not excessive.

One way to control the frequency of intra-group validation is to associate it with some commonly performed secure processing function that each member in the group performs. For example, each SECPROC can maintain a count of the number of times it performs the function, and can perform the validation procedure before the count reaches some value, X. Validation can occur before a SECPROC is requested to perform the function for the (X+1)th time. If validation is not successful, then the SECPROC will refuse to perform the function. This form of validation addresses the need to frequently confirm that a SECPROC has not failed or been stolen.

Consider the case of a group of two secure processors (SECPROCs) SP1 and SP2 that share some common information (characteristic) that defines them as a group, and which perform some function F. To maintain group security, SP1 can validate the trustworthiness of SP2, and SP2 can validate the trustworthiness of SP1. Validation can occur after a validation period has elapsed. The validation period may correspond to a number X of occurrences of the function F. Furthermore, the characteristic C will change after an update period, which is typically longer than the validation period. The group characteristic is generated by one SECPROC (SP1), and communicated (propagated) to the other SECPROC (SP2).

FIG. 1 is a diagrammatic illustration of a group of two security processors in accordance with the present invention. The cryptographic key Key12 is known to both processors SP1 10 and processor SP2 20. In FIG. 1, Key12 is used to perform validation. For example, SP1 can periodically perform a validation test to evaluate the trustworthiness of SP2. SP1 will note whether SP2 fails or passes the validation test, and can store the result in a memory for future reference. After the update period has elapsed, the characteristic C will be changed. The new characteristic can be generated by SP1 or obtained from a source which is external to the group. However, if SP1 has determined previously that SP2 has failed a validation test and is thus not trustworthy, SP1 will refuse to propagate C to SP2. At that point, SP2 is effectively exiled from the group, and SP1 remains as the sole functioning group member.

FIG. 1 introduces a graphical notation denoting the validation or propagation processes. SP1 can validate SP2 by transmitting a message to SP2 over communication path 12, and evaluating the subsequent reply message on path 12. SP2 can validate SP1 by transmitting a message over communication path 14 and evaluating the reply received over path 14. As discussed, the communication paths of the present invention can be virtual paths. Thus, paths 12 and 14 denote virtual paths that do not necessarily correspond to physical connections such as wires.

For example, SP1 may send a message via a host processor (not shown) with instructions that the message is to be delivered to SP2. The host processor will receive the message, determine the address of the intended recipient, and re-transmit the message to SP2. Moreover, the re-transmission may not necessarily be immediate, but may occur after the host has accumulated a certain amount of data for SP2 from one or more members. Additionally, the host processor may process the message to provide a different data format that is required by SP2.

As shown in FIG. 1, a total of at least four inter-element messages are required for a pair of SECPROCs to validate each other. This communication process, which can be considered an inter-element validation process, or alternatively, an element cross-validation process, is denoted by virtual path 16 in the rightmost portion of FIG. 1. This notation will be followed in the remainder of the figures.

Figure 2A:
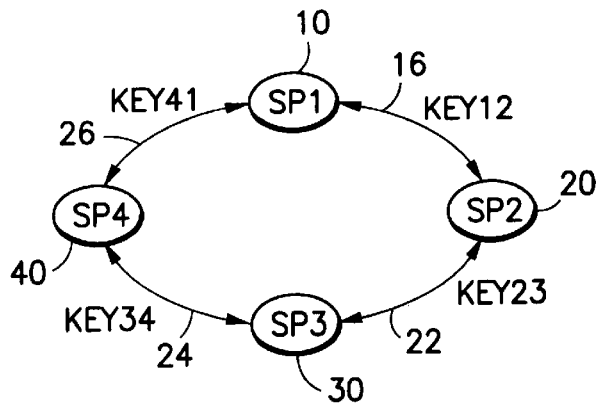
FIG. 2a is a diagrammatic illustration of a group of four secure processors in accordance with the present invention.

FIG. 2a is a diagrammatic illustration of a group of four security processors in accordance with the present invention. This is a more realistic and illustrative group topology. The group topology is clearly ring-like. Moreover, with the four-element network ring topology, each member validates two other elements. Group member SP1 10 communicates with SP2 20 via path 16, while SP2 communicates with SP3 30 via path 22, SP3 communicates with SP4 40 via path 24, and SP4 communicates with SP1 via path 26. Thus, the group members are adjacent to each other in a virtual or topological sense. For example, SP1 is adjacent to SP2 and SP4. With this topology, if one element fails, the disconnected neighbor element can propagate through the other, still viable element, thereby allowing group operation to continue. However, in a worst case scenario, if two elements such as SP4 and SP2 fail, the remaining elements SP1 and SP3 will not be able to communicate, and the entire network is failed. Accordingly, the network of FIG. 2a is said to be robust to the failure of only one element.

The network topology of FIG. 2a is efficient since each SECPROC is connected to only two other SECPROCs, and only four communication paths are required. In accordance with the present invention, validation of each SECPROC can occur with only a total of eight inter-member messages. Generally, 2N inter-member messages will be required for an N-member integrity group using the ring topology of FIG. 2a.

Figure 2B:
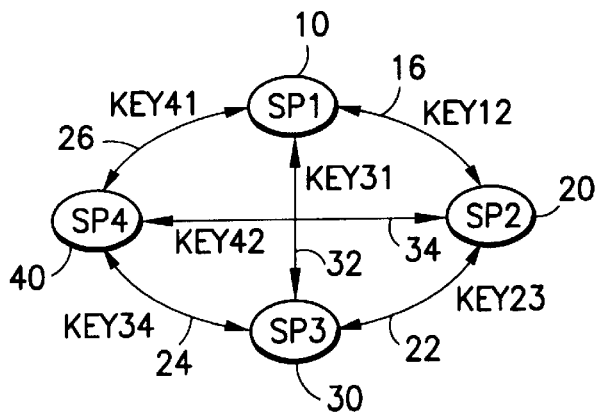
FIG. 2b is a diagrammatic illustration of an alternative embodiment of a group of four secure processors in accordance with the present invention.

FIG. 2b is a diagrammatic illustration of an alternative embodiment of a group of four security processors. Like-numbered elements of FIG. 2b correspond to the elements of FIG. 2b. FIG. 2b shows the case where cross-validation occurs between each possible pair of SECPROCs. That is, each member SECPROC validates all three of the other member SECPROCs. For example, SP1 can validate SP2 and SP4 as with the topology of FIG. 2a. However, communication path 32 allows SP1 to also validate SP3, and vice-versa. In turn, SP1 can be validated by SP2, SP3 and SP4. Furthermore, path 34 allows cross-validation between SP2 20 and SP4 40. Accordingly, it can be seen that when there are N group members, each member is validated N−1 times. This redundant validation process requires a relatively large amount of message traffic between the member SECPROCs. For instance, with N=4 members, there will be 2N(N−1)=2×4×3=24 inter-element messages.

Thus, the network topology of FIG. 2a improves on the redundant topology of FIG. 2b, where validation occurs between all pairs of group members; i.e., where each SECPROC validates all other SECPROCs individually. An improvement factor is given by the relation:

$$\frac{2N(N-1)}{2N} = N - 1.$$

For example, with N=4, inter-member message traffic is reduced by a factor of 3 (e.g., 24/8=3).

Thus, a significant reduction in message traffic can be realized with an appropriate choice of network topology and validation process. As discussed, the relatively simple network topology of FIG. 2a minimized the message traffic relative to the topology of FIG. 2b. However, a network topology must also meet a minimum reliability standard, which can be defined by a performance metric. The performance metric, which is an important network design consideration, is a measure of how robust a network is to the failure of a number, R, of integrity group members. R can assume the values 0, 1, ... N−1 (where N is the number of group members). The network of FIG. 2a is robust to the failure of a single member (R=1). For example, if SP1 fails, the other members (SP2, SP3 and SP4) can still function and propagate the group characteristic C.

Figure 3A:
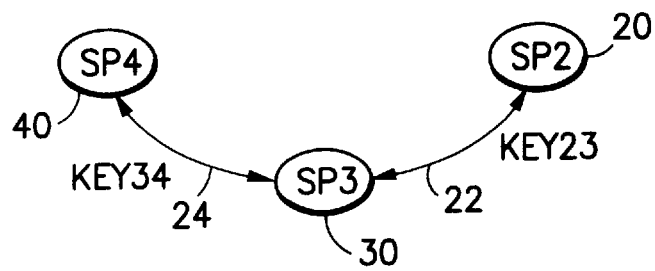
FIG. 3a is a diagrammatic illustration of the group of FIG. 2a following the removal or failure of the group member SP1.

FIG. 3a is a diagrammatic illustration of the group of FIG. 2a following the removal or failure of the group member SP1. Like-numbered elements in FIG. 3a correspond to the elements of FIG. 2a. Even with the loss of SP1 and the communication paths between SP1 and SP2, and SP1 and SP4, messages can still be exchanged by all remaining group members when required, for example, to propagate a group characteristic. SP3 and SP4 can still communicate directly with each other, and SP3 and SP2 can similarly still communicate directly with each other. Moreover, SP4 and SP2 can communicate indirectly with each other by relaying messages through SP3.

Thus, with the four-element ring of FIG. 2a, each member validates two other elements. If one element fails, the disconnected neighbor element can propagate through another, still viable element, thereby allowing the group to continue to operate. Moreover, the network can remain viable even after the failure of two elements. For instance, if both elements SP1 and SP2 fail, SP3 and SP4 can continue to communicate and operate as members of a two-element group. The failure of three of the four elements in the network of FIG. 2a results in the degenerate case of one remaining element.

However, the failure of two SECPROCs in a worst case scenario can cause the entire network of FIG. 2a to fail. For instance, if elements SP4 and SP2 fail, the remaining elements SP1 and SP3 will not be able to communicate, and the entire network fails. Accordingly, since robustness must be determined in a worst case failure scenario, the network of FIG. 2a is said to be robust to the failure of only one element.

Thus, when more than one SECPROC fails (e.g., R>1), it is possible for the failures to occur in network locations that allow continued function. However, network design must be based on a worst case failure scenario, where failures are clustered in members immediately surrounding a member that does not fail, thereby potentially isolating a viable group member. In order for a member element to always have a communication (propagation) path to another still-functioning element following the failure of R other elements, each element must be connected to at least R+1 other elements via R+1 separate communication paths.

Figure 3B:
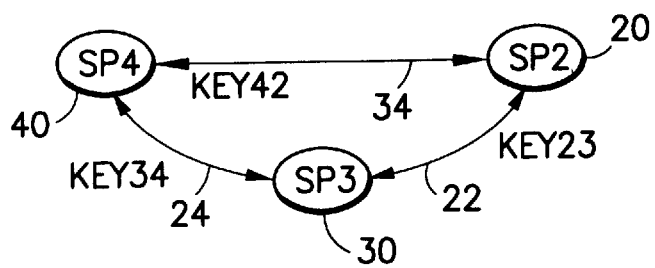
FIG. 3b is a diagrammatic illustration of the group of FIG. 2b following the removal or failure of the group member SP1.

Similar to the network of FIG. 2a, FIG. 2b also shows a network with four member elements. However, here the elements are configured in a network that is robust to the failure of any two elements, even if the failed elements are clustered near each other. For example, referring also to FIG. 3b, consider the scenario where group member SP1 fails or is removed from the group. Like-numbered elements in FIG. 3b correspond to the elements of FIG. 2b. In this case, the communication paths between SP1 and SP2, SP1 and SP3, and SP1 and SP4 are lost. However, direct communication paths remain between SP4 and SP2, SP4 and SP3, and SP2 and SP3. Accordingly, all remaining functioning elements can communicate with one another, and the group can continue to function.

The network of FIG. 2b demonstrates that it is possible to improve the robustness of a network with a given number of member elements by using a more complex network topology. To improve network robustness, each member element is connected to additional member elements via additional virtual communication paths (channels) which can be utilized in the event of a worst case failure. Moreover, the additional paths are typically available at all times. It will be noted that increased network complexity results in lower performance since additional message traffic is required to perform the validation process. Nevertheless, a topology which provides diminished security with increased reliability may be suitable for many networks.

Figure 4A:
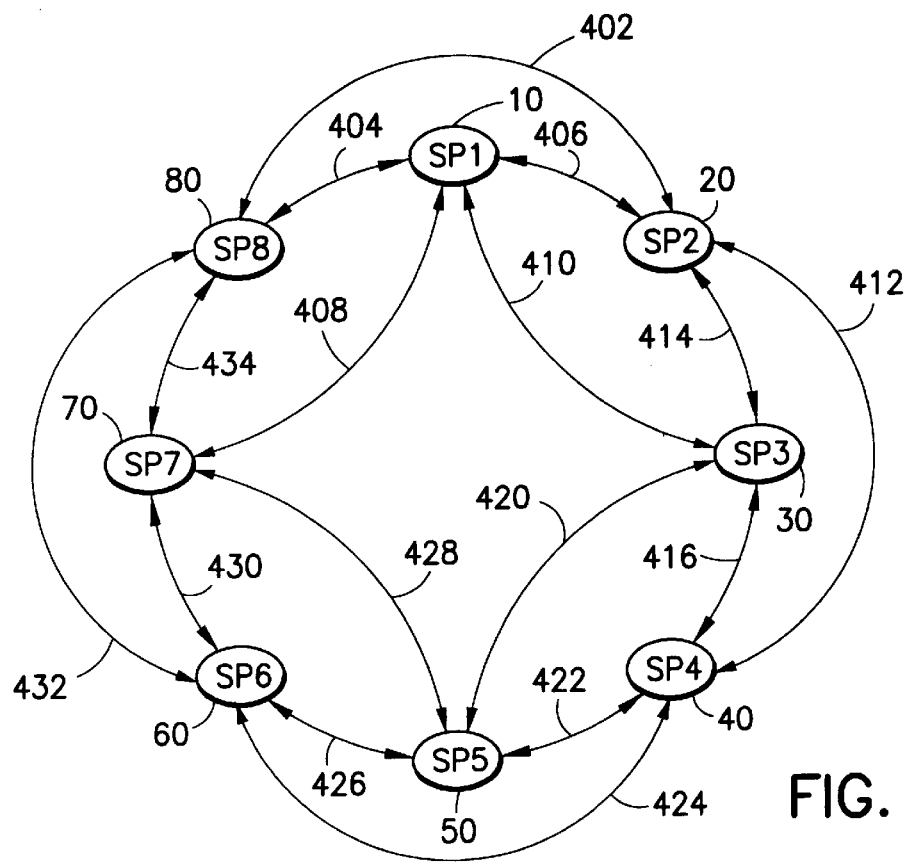
FIG. 4a is a diagrammatic illustration of a group of eight secure processors in accordance with the present invention.

FIG. 4a is a diagrammatic illustration of a group of eight security processors in accordance with the present invention. The network is robust to the failure of any three elements. The elements (SECPROCs) in the network are SP1 10, SP2 20, SP3 30, SP4 40, SP5 50, SP6 60, SP7 70 and SP8 80. Each element has a direct communication path with four other elements. Specifically, SP1 10 can communicate with SP2, SP3, SP7 and SP8 via paths 406, 410, 408 and 404, respectively. SP2 20 can communicate with SP1, SP3, SP4 and SP8 via paths 406, 414, 412 and 402, respectively. SP3 30 can communicate with SP1, SP2, SP4 and SP5 via paths 410, 414, 416 and 420, respectively. SP4 40 can communicate with SP2, SP3, SP5 and SP6 via paths 412, 416, 422 and 424, respectively. SP5 50 can communicate with SP3, SP4, SP6 and SP7 via paths 420, 422, 426 and 428, respectively. SP6 60 can communicate with SP4, SP5, SP7 and SP8 via paths 424, 426, 430 and 432, respectively. SP7 70 can communicate with SP1, SP5, SP6 and SP8 via paths 408, 428, 430 and 434, respectively. Lastly, SP8 80 can communicate with SP1, SP2, SP6 and SP7 via paths 404, 402, 432 and 434, respectively.

Figure 4B:
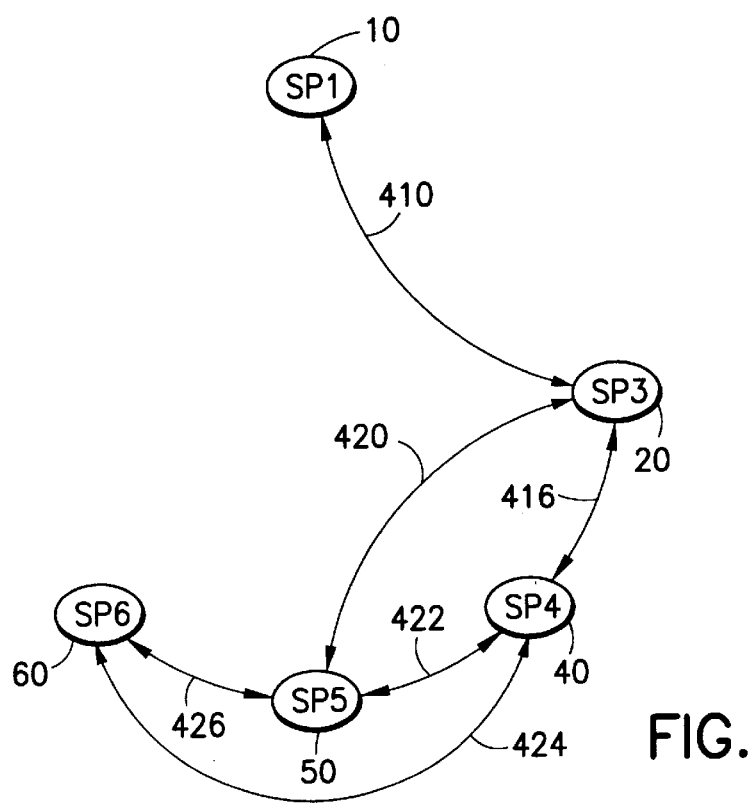
FIG. 4b is a diagrammatic illustration of the group of FIG. 4a following the removal or failure of the group members SP2, SP7 and SP8.

Accordingly, the network is robust to R=N-1=4-1=3 failures. For instance, note that SP1 communicates directly with SP2, SP3, SP7 and SP8. Even if SP2, SP3 and SP7 fail, SP1 can still communicate with SP8 and thus remains a viable group member. For instance, consider element SP1. A worst case failure scenario with R=3 is the failure of neighboring elements SP8 and SP2, and either SP7 or SP3. For instance, FIG. 4b is a diagrammatic illustration of the group of FIG. 4a following the removal or failure of the group members SP2, SP7 and SP8. Like-numbered elements in FIG. 4b correspond to the elements of FIG. 4a. If SP2, SP7 and SP8 fail, SP1 can still communicate with element SP3 via path 410. Similarly, if SP2, SP3 and SP8 fail, SP1 can still communicate with element SP7 via path 408.

Generally, the design of secure networks into a topology that is robust to a particular number of failures R is similar to certain problems in graph theory. It should be clear that networks with arbitrarily large amounts of robustness R are possible for groups with enough members, given the necessary increase in message traffic for network validation.

Given a validation process, an integrity group, a set of four members of this group, and a group characteristic by which membership in the group is controlled, a specific example of an intra-group validation scheme of the present invention is now provided. Referring again to FIG. 2a, it is seen that the SECPROCs SP1 and SP2 share common information used for validation (e.g., Key12). Each of these two SECPROCs must possess Key12 in order to perform the validation. In one embodiment, each element validates the other elements after a maximum of X occurrences of function F. On some other, longer term basis, the characteristic C will change.

SP1 can validate SP2 using any of a number of secure cryptographic knowledge proof protocols. For example, a simple proof-of-knowledge protocol, which could be called a basic digital signature protocol, can be used. FIG. 5 is a flow chart of one possible inter-element validation procedure in accordance with the present invention. The validation procedure starts at block 500. At block 510, SP1 generates a validation message using knowledge that is shared between SP1 and SP2. For instance, for two SECPROCs, SP1 and SP2, which possess a shared key, Key12, for which proof of possession is desired, SP1 can create a random value V that it encrypts using Key12 and an encryption function E to obtain the encrypted value X1. That is, $X1=E_{K12}[V]$, where the term "$E_{K12}$" indicates that the encryption occurs under Key12. At block 520, the validation message, X1, is then communicated from SP1 to SP2 using the communication path that directly couples SP1 with SP2. At block 530, SP2 receives the validation message and generates a reply message. For instance, SP2 can encrypt X1 under Key12 to form the value $X2=E_{K12}[X1]=E_{K12}[E_{K12}[V]]$. At block 535, the value X2 is then passed back to SP1. At block 540, SP1 receives and evaluates this reply message. SP1 decrypts the returned value twice to form a value Y, which should be the same as V if SP2 performed the encryption under Key12. SP1, which retained the random value V used in the information sent to SP2, compares Y to the stored value of V to see if they are equal. At block 550, if SP2 is found to be trustworthy, SP2 is deemed valid by SP1, and this information is stored in memory (block 560). In this case, SP1 can have confidence that SP2 actually possesses Key12 and, therefore, presumably remains secure. If SP2 is found to be untrustworthy, SP2 is deemed invalid and this information is stored in memory (block 570). The inter-element validation procedure terminates at block 580.

Figure 6:
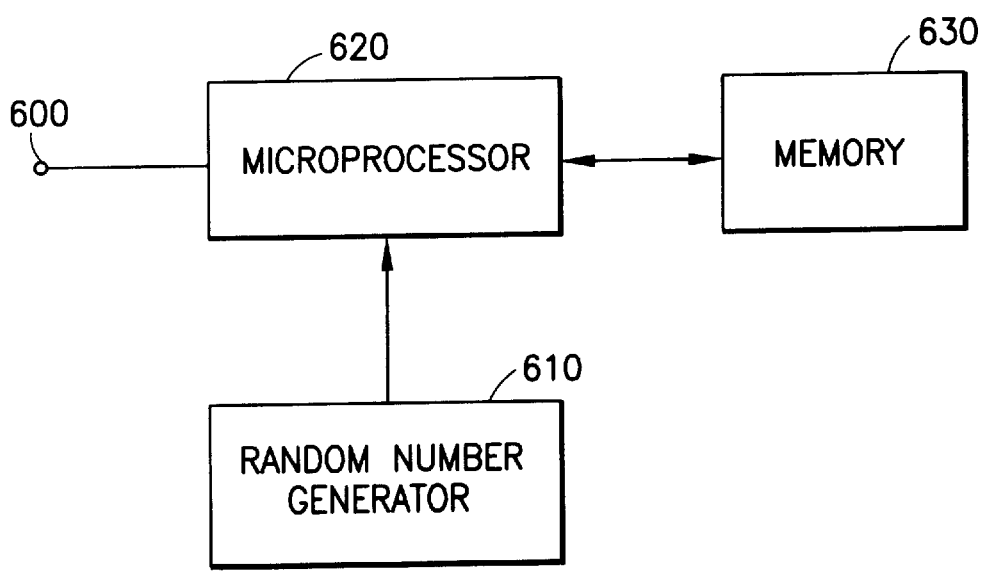
FIG. 6 is a block diagram illustration of a secure processor in accordance with the present invention.

FIG. 6 is a block diagram of a secure processor in accordance with the present invention which may be used to accomplish the above validation procedure. The processor 10 includes a microprocessor 620 which receives messages from, and provides messages to, other group elements via a terminal 600. Additionally, the microprocessor 620 may receive data from, or transmit data to, sources which are external to the group. The microprocessor 620 is coupled to a memory 630 which may comprise, for instance, read-only memory (ROM) which stores program code for the microprocessor, and random-access memory (RAM) which stores data indicating whether a particular group member is valid. As indicated above, one of the SECPROCs will generate, in its associated microprocessor, the group characteristic. Then, before propagating the group characteristic to another member, the microprocessor 620 of the processing member (SECPROC) will first check the validity of the member that is to receive the group characteristic. If the member is not valid, the SECPROC will not pass on the group characteristic, thereby exiling the invalid member.

In the network of FIG. 2a, Key12 is known to both SP1 and SP2. SP1 can prove that SP2 has possession of Key12 by using the aforementioned procedure. To do this, SP1 sends a processed message to SP2, which further processes it and returns the result in a message to SP1. If the return message proves that SP2 has possession of the correct information (e.g., Key12), then SP1 will consider SP2 to be validated and trustworthy. A similar process is repeated for each SECPROC and its adjacent neighbors at least every X executions of the integrity group member function F. That is, validation can occur between members SP2 and SP3 using Key23, between SP3 and SP4 using Key34, and between SP4 and SP1 using Key41. Referring to FIG. 2b, additional validation can occur between SP4 and SP2 using Key 42, and between SP1 and SP3 using Key13.

The above method employs symmetric (e.g., conventional) encryption since the same key is used by both group members involved. Other methods of proof include asymmetric (e.g., public key) encryption. With public key encryption, a different key ($K_E$) is used to encrypt a message than the key ($K_D$) used to decrypt it. Moreover, neither key is computable from the other key. In this case, SP1 and SP2 could each hold the other's encrypt key only. Validation is performed by SP1 generating a random value V, encrypting it under SP2's encryption key $K_E 2$ and passing it to SP2. SP2, which is the only place the decryption key $K_D 2$ exists, decrypts this message to obtain V. SP2 then encrypts V under SP1's encrypt key $K_E 1$, and passes the resulting value to SP1. SP1 decrypts the received value with its decrypt key $K_D 1$ to form a value Y, which should equal the originally generated V. This decrypted result is compared to V, and SP2 is deemed trustworthy by SP1 if Y and V match.

Furthermore, when the characteristic update period has elapsed in the network, one of the four SECPROCs in FIG. 2a will generate a new characteristic C. The selected SECPROC can use an internal random number generation capability (e.g., random number generator 610 in FIG. 6) to create a new characteristic C. For instance, assuming SP1 is the designated element, SP1 will generate C and propagate it to SP2 and SP4 if SP1 has determined that SP2 and SP4 are trustworthy. SP1 will refuse to propagate C to a neighbor member if that neighbor has ever failed the validation procedure. Additionally, either SP2 or SP4 can be used to propagate the characteristic to SP3.

As a further example, referring again to the network of FIG. 2b, assume the validation of SP1 by SP2, SP3 and SP4 fails. Additionally, let SP3 be the current element which generates the new C. SP3 will communicate C to neighboring elements SP2 and SP4, assuming that SP3 has previously ascertained that SP2 and SP4 are trustworthy. This propagation can be done using some shared knowledge such as validation keys Key34 and Key23, or using some other shared information. However, SP3 will not propagate the characteristic to SP1 since SP1 failed the validation test. In the absence of a validation failure, once C has propagated from SP3 to SP2, and from SP3 to SP4, one or both of SP2 and "SP4" would then normally re-propagate C to SP1. However, SP2 and SP4 had previously determined that SP1 was untrustworthy due to failure of a validation test. Accordingly, the propagation of characteristic C stops before it reaches SP1, thereby effectively exiling SP1 from the group. Furthermore, the example emphasizes the need to perform frequent validity tests.

Figure 7:
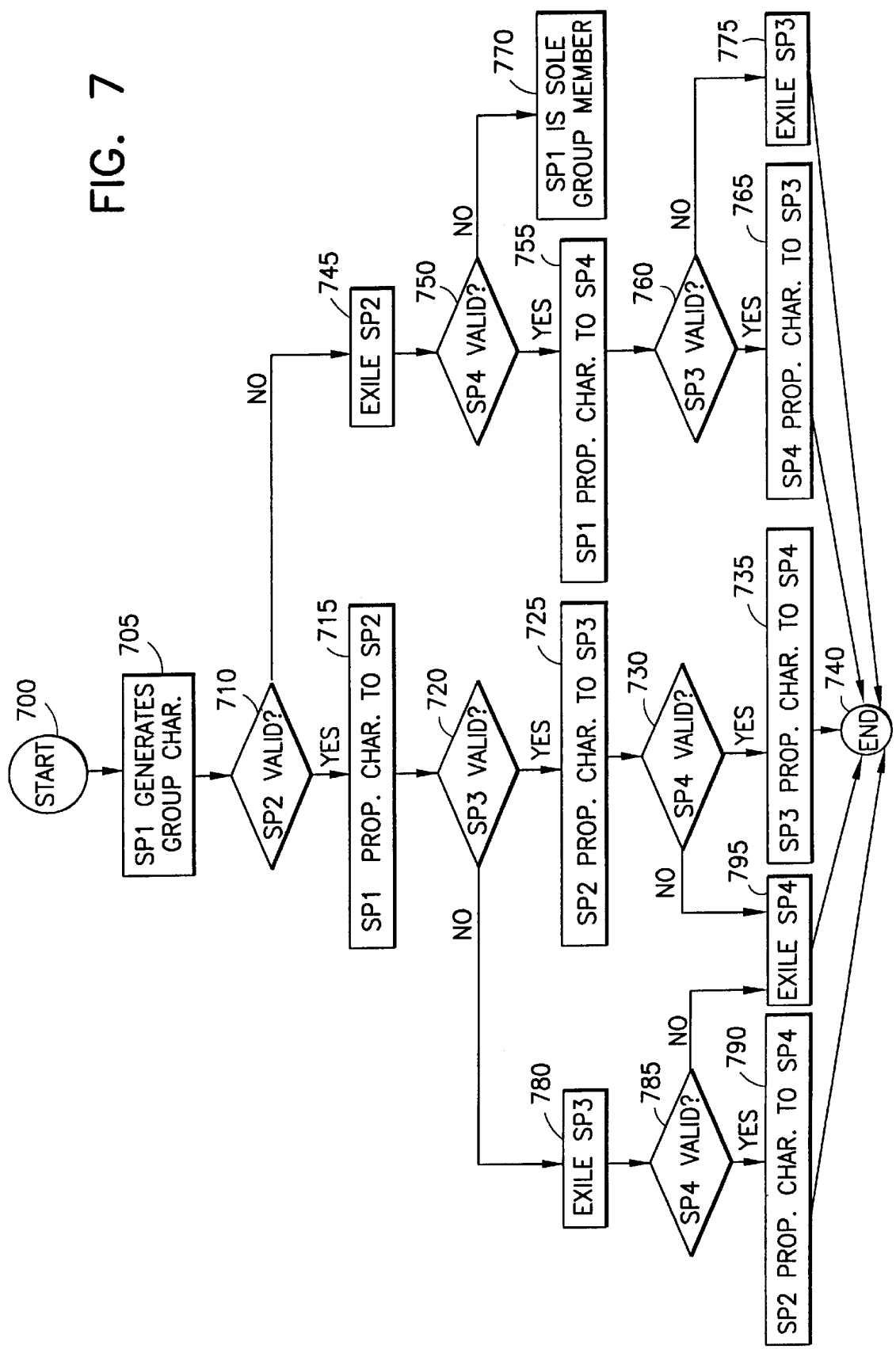
FIG. 7 is a flow chart of a group validation procedure in accordance with the present invention.

FIG. 7 is a flow chart of a group validation procedure in accordance with the present invention. In FIG. 7, "char." is an abbreviation for "characteristic," and "prop." is an abbreviation for "propagate." The procedure corresponds to the group topology of FIG. 2a, but the concept can be extended to other topologies. The procedure begins at block 700. At block 705, SP1, in this example, generates a new group characteristic. At block 710, SP1 decides if SP2 is valid. This decision may involve the retrieval of previously stored data which resulted from the validation procedure of FIG. 5. Alternatively, SP1 may validate SP2 in real time. If SP2 is valid in SP1's determination, SP1 will propagate the group characteristic to SP2 at block 715. At block 720, SP2 decides if SP3 is valid. If so, SP2 propagates the characteristic to SP3 at block 725. At block 730, SP3 decides if SP4 is valid. If so, SP3 propagates the characteristic to SP4 at block 735, and the procedure ends at block 740. After the above steps have been completed, the entire network will have access to the group characteristic, and can continue to function.

However, if an element has been found to be invalid (untrustworthy), the invalid member must be exiled from the group. For instance, if SP2 is deemed invalid by SP1 at block 710, SP2 will be exiled at block 745. This means that SP1 will not propagate the new characteristic to SP2. SP1 will then attempt to propagate the characteristic using an alternative path which is provided by the topology of FIG. 2a. SP1's only remaining link to the group is via path 26 to SP4 40 (FIG. 2a). Thus, at block 750, SP1 decides if SP4 is valid. If so, SP1 propagates the characteristic to SP4 at block 755. SP4 then decides if SP3 is valid at block 760. If so, SP4 propagates the group characteristic to SP3 at block 765, and the procedure ends at block 740. Here, all remaining elements of the group (SP1, SP3 and SP4) have access to the group characteristic and the group can continue to function without SP2.

If SP1 deems SP4 invalid at block 750, SP1 will not be able to communicate with any remaining valid group member (e.g., SP3), and will therefore be the sole remaining group member (block 770). Note that a group can function with only one member.

If SP4 deems SP3 invalid at block 760, SP3 will be exiled at block 775, and the procedure will end at block 740. In this case, SP1 and SP4 will be the remaining valid group members.

If the group characteristic is successfully propagated from SP1 to SP2, but SP2 deems SP3 invalid at block 720, SP3 will be exiled as shown at block 780. If SP2 deems SP4 valid at block 785, SP2 will propagate the group characteristic to SP4 (via SP1) at block 790, and the procedure will end at block 740. Note that SP1, SP2 and SP4 will be the remaining valid group members.

However, if SP2 deems SP4 invalid at block 785, SP4 will be exiled as shown at block 795, and SP1 and SP2 will be the only remaining valid group members.

Once all members of the group have been either supplied with the group characteristic or exiled from the group, the group can continue to function until the next new characteristic is generated. For instance, SP2 may be the next element to provide the new characteristic. The procedure of FIG. 7 will then be repeated in a manner which is analogous to the foregoing in order to propagate the new characteristic.

Thus, it can be seen that the present invention provides a method and apparatus for validating the integrity of secure processing elements which are members of a network group. The group is defined by a group characteristic, which is information that each group member requires in order to function. The invention provides a scheme for preventing propagation of the characteristic to group members which have been deemed untrustworthy. The untrustworthy member is effectively exiled from the group.

Additionally, the invention is applicable to multiple group topologies, such as where an element or elements are shared among more than one group, or where a group is provided as a subset of another group. Generally, the invention is applicable to any communication system which includes one or more networks or groups that are independent or interdependent. Finally, the invention obtains the above benefits while providing an efficient network topology that minimizes inter-member message traffic and maintains group robustness.

Although the invention has been described in connection with various specific embodiments, those skilled in the art will appreciate that numerous adaptations and modifications may be made thereto without departing from the spirit and scope of the invention as set forth in the claims.

I claim:

1. A communication system including at least first, second, and third processing members, comprising:
   a first virtual communication path for allowing said first member to communicate with said second member;
   a second virtual communication path for allowing said second member to communicate with said third member;
   a third virtual communication path for allowing said first member to communicate with said third member;
   first validating means for enabling the first member to validate the second member;
   means responsive to said first validating means for propagating a characteristic from said first member to said second member via said first virtual communication path if said second member meets a first validation criteria;
   second validating means for enabling the second member to validate the third member;
   means responsive to said second validating means for propagating said characteristic from said second member to said third member via said second virtual communication path if said third member meets a second validation criteria;
   third validating means for enabling the first member to validate the third member when said second member does not meet the first validation criteria; and
   means responsive to said third validating means for propagating said characteristic from said first member to said third member via said third virtual communication path if said third member meets a third validation criteria;
   wherein said characteristic provides information required by said first, second and third processing members to perform a function.

2. The system of claim 1, further comprising:
   exiling means responsive to said first validating means and at least one of said second and third validating means for exiling at least one of said second and third processing members by preventing the propagation of said characteristic to the exiled member;
   wherein said system is robust to the exiling of at least one member such that the remaining, non-exiled members can continue to communicate with one another.

3. The system of claim 1, wherein:
   said first validating means detects whether said second member has been operatively removed from said system; and
   at least one of said first and second validating means detects whether said third member has been operatively removed from said system;
   said system further comprising:
   exiling means responsive to said first validating means for exiling said second member when said second member has been operatively removed from said system by preventing the propagation of said characteristic to said second member; and
   exiling means responsive to at least one of said first and second validating means for exiling said third member when said third member has been operatively removed from said system by preventing the propagation of said characteristic to said third member;
   wherein said system is robust to the removal of at least one member such that the remaining, non-removed members can continue to communicate with one another.

4. The system of claim 1, wherein at least one of said first, second and third validating means includes counting means for determining when a number X of occurrences of said function have been performed; and,
   the validation of at least one of said second and third members is scheduled in response to said counting means.

5. The system of claim 1, wherein at least one of said first, second and third validating means is responsive to data which is known to both the member which is validating and the member which is being validated.

6. The system of claim 5, wherein said data which is known to both the member which is validating and the member which is being validated comprises a cryptographic key.

7. The system of claim 1, wherein each of said processing members possesses information that allows it to validate at least one other of said processing members.

8. The system of claim 7, wherein said information is a key of an asymmetric cryptographic algorithm.

9. The system of claim 1, wherein said processing members are arranged in a virtual ring topology.

10. The system of claim 1, wherein at least one of said first, second and third members belongs to two different networks, each of which is arranged in a virtual ring topology.

11. The system of claim 10, wherein one of said two different networks is a subset of the other of said two different networks.

12. The system of claim 1, wherein:
    said system comprises at least four processing members;

virtual communication paths are arranged between non-adjacent pairs of said processing members to allow communication therebetween; and said system is robust to the failure of at least two processing members.

13. A method for enabling first, second and third processing members of a communication system to securely communicate with one another, comprising the steps of:

(a) generating a first validation message for use by said first member;

communicating said first validation message from said first member to said second member via a first virtual communication path for use in determining the trustworthiness of said second member; and propagating a characteristic from said first member to said second member if said second member is found to be trustworthy by said first member;

(b) if said second member is found to be trustworthy by said first member:

generating a second validation message for use by said second member;

communicating said second validation message from said second member to said third member via a second virtual communication path for use in determining the trustworthiness of said third member; and propagating said characteristic from said second member to said third member if said third member is found to be trustworthily by said second member; and (c) if said second member is not found to be trustworthy by said first member:

generating a third validation message for use by said first member;

communicating said third validation message from said first member to said third member via a third virtual communication path for use in determining the trustworthiness of said third member; and propagating said characteristic from said first member to said third member if said third member is found to be trustworthy by said first member.

14. The method of claim 13 comprising the further steps of:

(a) generating a first reply message in response to said first validation message for use by said second member; and communicating said first reply message from said second member to said first member, said first member using said reply message and said first validation message to attempt to validates said second member;

(b) if said second member is found to be trustworthy by said first member:

generating a second reply message in response to said second validation message for use by said third member; and communicating said second reply message from said third member to said second member, said second member using said second reply message and said second validation message to attempt to validate said third member; and (c) if said second member is not found to be trustworthy by said first member:

generating a third reply message in response to said third validation message for use by said third member; and communicating said third reply message from said third member to said first member, said first member using said third reply message and said third validation message to attempt to validate said third member.

15. The method of claim 13, wherein said characteristic provides information required by said members to perform a function.

16. The method of claim 13, comprising the further step of:

determining when a number X of occurrences of said function have been performed for at least one of said first, second and third members;

wherein the validation of at least one of said second and third members is repeated when said number X of occurrences of said function is reached.

17. The method of claim 13, comprising the further steps of:

exiling said second member from said system by not allowing said characteristic to be propagated to said second member if said second member is not found to be trustworthy by said first member; and exiling said third member from said system by not allowing said characteristic to be propagated to said third member if said third-member is not found to be trustworthy by said first or second member; wherein said system is robust to the exiling of at least one exiled member such that the remaining, non-exiled members can continue to communicate with one another.

18. The method of claim 13, comprising the further step of:

detecting whether said second member has been operatively removed from said system, and, if so, exiling said second member from said system by not allowing said characteristic to be propagated to said second member;

detecting whether said third member has been operatively removed from said system, and, if so, exiling said third member from said system by not allowing said characteristic to be propagated to said third member.

19. The system of claim 1, wherein:

said system comprises at least eight processing members;

virtual communication paths are arranged between non-adjacent pairs of said processing members to allow communication therebetween; and said system is robust to the failure of at least three processing members.

20. The method of claim 13, wherein:

said system comprises at least eight processing members;

virtual communication paths are arranged between non-adjacent pairs of said processing members to allow communication therebetween; and said system is robust to the failure of at least three processing members.

* * * * *